(12) United States Patent
Lautenschläger

(10) Patent No.: US 12,623,195 B2
(45) Date of Patent: May 12, 2026

(54) PRESSURE VESSEL SYSTEM

(71) Applicants: MLS MIKROWELLEN-LABOR-SYSTEME GMBH, Leutkirch (DE); Mikrowellen Labor Technik AG, Heerbrugg (CH)

(72) Inventor: Werner Lautenschläger, Leutkirch (DE)

(73) Assignee: Mikrowellen Labor Technik AG, Heerbrugg (CH)

( * ) Notice: Subject to any disclaimer, the term of this patent is extended or adjusted under 35 U.S.C. 154(b) by 841 days.

(21) Appl. No.: 17/432,186

(22) PCT Filed: Feb. 21, 2020

(86) PCT No.: PCT/EP2020/054598

§ 371 (c)(1),
(2) Date: Aug. 19, 2021

(87) PCT Pub. No.: WO2020/169791

PCT Pub. Date: Aug. 27, 2020

(65) Prior Publication Data

US 2022/0184573 A1     Jun. 16, 2022

(30) Foreign Application Priority Data

Feb. 21, 2019    (DE) .................... 20 2019 100 988.8

(51) Int. Cl.
B01J 3/02        (2006.01)
B01J 3/00        (2006.01)
(Continued)

(52) U.S. Cl.
CPC ................ B01J 3/04 (2013.01); B01J 3/002 (2013.01); B01J 3/02 (2013.01); B01J 3/03 (2013.01)

(58) Field of Classification Search
None
See application file for complete search history.

(56) References Cited

U.S. PATENT DOCUMENTS 3,640,392 A * 2/1972 Smith .................... B01D 29/23
                                                          55/378
4,620,563 A    11/1986 Meidl et al.
                        (Continued)

FOREIGN PATENT DOCUMENTS

CN        201389459 Y  *  1/2010
CN        109025540 A  *  12/2018 ............ E05F 15/635
RO         126523 B1  *  6/2012

OTHER PUBLICATIONS

Oxford English Dictionary. "Rigid". Retrieved from www.oed.com on Jan. 8, 2025. (Year: 2025).*
(Continued)

*Primary Examiner* — Jennifer A Leung
(74) *Attorney, Agent, or Firm* — The H.T. Than Law Group

(57)                ABSTRACT

The present invention relates to a pressure vessel system (1), comprising: —a pressure vessel (2) having a reaction chamber (3) in the form of a pressure chamber for initiating and/or promoting chemical and/or physical pressurized reactions of samples (P) received in the reaction chamber (3); and—a rail (50), which is rigidly connected to one pail of the pressure vessel (2) and has a first connection point (51) for admitting fluid, a second connection point (52) for discharging fluid and a fluid line (53), which fluidically connects the first connection point (51) to the second connection point (52), the fluid line (53) being fluidically connected to the reaction chamber (3) via the second connection point (52), and the rail (50) comprising at least one third connection point (55), which is fluidically connected to the fluid line (53) and can be connected to a device (56) such that the device (56) is
(Continued)

Figure 1:
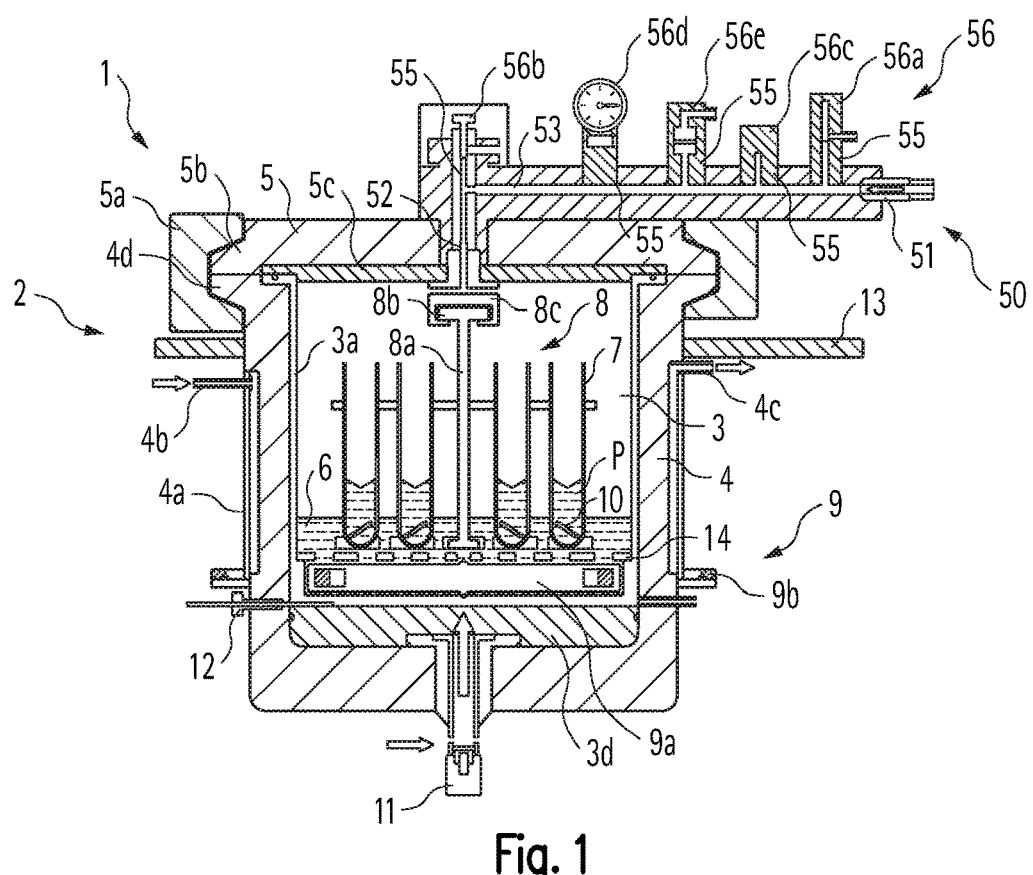

fluidically connected to the fluid line (53) and thus to the reaction chamber (3).

27 Claims, 3 Drawing Sheets

(51) Int. Cl.
　　　*B01J 3/03*　　　　　(2006.01)
　　　*B01J 3/04*　　　　　(2006.01)

(56)　　　　　　　References Cited

U.S. PATENT DOCUMENTS

| | | | | |
|---|---|---|---|---|
| 5,246,581 | A | * | 9/1993 | Goldman ............... B01D 29/96 |
| | | | | 210/453 |
| 5,725,835 | A | | 3/1998 | Lautenschläger |
| 2002/0176814 | A1 | | 11/2002 | Lautenschläger et al. |
| 2006/0251145 | A1 | * | 11/2006 | Brushwyler ........... G01K 17/00 |
| | | | | 374/31 |
| 2010/0150795 | A1 | * | 6/2010 | Boyle ..................... C22B 43/00 |
| | | | | 422/198 |
| 2020/0038828 | A1 | | 2/2020 | Lautenschläger et al. |

OTHER PUBLICATIONS

International Search Report issued in connection with the corresponding International Application No. PCT/EP2020/054598 on May 8, 2020.

* cited by examiner

PRESSURE VESSEL SYSTEM

1. FIELD OF THE INVENTION

The present invention relates to a pressure vessel system comprising a pressure vessel having a reaction chamber as a pressure space for initiating and/or promoting chemical and/or physical pressure reactions of samples accommodated in the reaction chamber.

2. BACKGROUND

Pressure vessel systems of the type mentioned at the outset are known in principle from the prior art. In addition, fluidically connecting all valves, sensors and fluid conduits and discharge conduits to the reaction chamber or the pressure vessel via pipe and/or hose connections is known. A disadvantage of this is that a very large number of connections with sealing rings, screw connections, etc., are necessary, as a result of which the connections are not leak-free in the long term and are less resistant to pressure. Furthermore, there are in total very long conduits in which aggressive chemicals are present or condense over a prolonged period of time and thus can lead to metallic contamination (introduction of elements) and to corrosion of the respective conduit. The conduits thus tend to give relatively high analytically blank values. The comparatively large number of pipe and/or hose connections and the devices connected via these also does not allow efficient cleaning of the respective couplings and conduits. In addition, the installation and maintenance of the devices to be fluidically connected is comparatively complicated.

In summary, it can thus be said that the pressure vessel systems known from the prior art provide a comparatively complicated and insecure fluidic connection of the devices (valves, sensors, fluid inlet, fluid outlet, etc.) to the reaction chamber.

Proceeding from this prior art, it is an object of the present invention to overcome the abovementioned disadvantages of the prior art, i.e., in particular, provide a pressure vessel system which can fluidically connect all devices to the reaction chamber more efficiently and securely.

These and other objects which are mentioned in the following description or can be discerned by a person skilled in the art on reading the description are achieved by the subject matter of the independent claims. Advantageous embodiments are subject matter of the dependent claims referring back thereto.

3. COMPREHENSIVE DESCRIPTION OF THE INVENTION

A pressure vessel system according to the invention comprises: a pressure vessel having a reactor chamber as pressure space for initiating and/or promoting chemical and/or physical pressure reactions of samples accommodated in the reaction chamber and a rigid rail which is connected rigidly to the pressure vessel or to at least part of the pressure vessel and has a first connection to the fluid inlet, a second connection to the fluid outlet and a fluid conduit which fluidically connects the first connection to the second connection. The fluid conduit is fluidically connected via the second connection to the reaction chamber and the rail has at least one third connection which is fluidically connected to the fluid conduit and which can be connected to a device, so that the device is fluidically connected to the fluid conduit and thus to the reaction chamber.

In other words, a pressure vessel system which can, preferably supportively, hold all devices (sensors, fluid feed conduits, fluid discharge conduits, etc.) by means of a single rigid rail and fluidically connect them to the reaction chamber is proposed. For this purpose, the fluid conduit is preferably formed by a hollow space, for example a drilled hole, in the rigid rail, with this hollow space (fluidically) connecting all connections to one another and thus forming the fluid conduit which connects the connections. The fluid conduit or the hollow space is consequently provided integrally with or in the rigid rail. Furthermore, the rigid, i.e. in particular immobile, nonelastic and direct mechanical connection between the pressure vessel and the rail results in the rail being fluidically and mechanically connected particularly firmly and readily accessibly to the pressure vessel or the reaction chamber. In this way, all devices can be fluidically connected particularly efficiently (reduction in the assembly time, the construction material, the construction space, etc.) and securely, in particular rigidly, to the rail and thus the reaction chamber. Insecure pipe and hose connections laid in a complicated manner, as are known from the prior art, can thus be dispensed with completely or at least be considerably reduced.

The pressure vessel preferably has a lid which can be moved between an open position, in which the reaction chamber is open, and a closed position, in which the reaction chamber is closed, with the rail being rigidly connected to the lid (as part of the pressure vessel and thus with the pressure vessel). Since the lid is generally provided at a readily accessible position on the pressure vessel, particularly good, i.e. particularly efficient and secure, accessibility of the rail can thus be provided. Furthermore, the lid, in particular the side of the lid facing away from the reaction chamber, is suitable for particularly good rigid fastening of the rail.

The rail is preferably configured and connected to the lid in such a way that the lid can be moved between the open position and the closed position by moving, preferably by raising and lowering, the rail. In other words, the rail can be provided as lifting rod for the abovementioned movement of the lid. As a consequence, further means for moving the lid between the open position and the closed position can be dispensed with, so that the pressure vessel system can be configured particularly compactly. Since the at least one device can be held, preferably supportively, by the rail during this movement, there is no risk of a fluid connection (for example a hose) between the rail and the at least one device influencing or adversely affecting this movement.

The rail preferably has a fastened region via which the rail can be fastened to a transport device, for example a raising and lowering device, for moving or raising and lowering the rail and thus for moving the lid between the open position and the closed position. The fastening region here enables, in particular, the rail to be fastened in a defined position and/or orientation to the transport device.

The pressure vessel system can additionally have a transport device, preferably a raising and lowering device, for moving or raising and lowering the rail and thus for moving the lid between the open position and the closed position, with the rail preferably being fastened via the fastening region to the transport device. The lid can thus be moved particularly simply, in particularly automatically and/or with the aid of a drive (electric motor, etc.), between the open position and the closed position.

Preference is given to the rail being able to be moved relative to the transport device or an axis (for example along a translatory axis or an inclined axis), in particular being able to be inclined, and the pressure vessel system having a sensor which is able to recognize the closure position of the lid on the basis of a relative movement, in particular inclination movement, of the rail relative to the transport device and relative to the axis, where the relative movement is brought about by movement of the lid into the closed position. The closed position of the lid which has been detected in this way can then be transmitted, for example, to a control device in order to control the pressure vessel system in an appropriate way. For example, the control device can then control the pressure vessel system in such a way that the pressure reaction is carried out in the reaction chamber and/or the lid is additionally secured, for example, means of a closure or securing element, for a subsequent pressure reaction in the reaction chamber.

The sensor is preferably able to measure a contact pressure force of the lid due to the relative movement for closing the reaction chamber in the closed position and recognize the closed position as soon as the contact pressure force exceeds a defined threshold contact pressure force. In this way, it can be ensured in a particularly simple manner that the lid closes the reaction chamber with a sufficient contact pressure force in the closed position in order thus to carry out the pressure reaction in the reaction chamber safely. Furthermore, it is thus possible to prevent having an excessively high closing force which could lead to damage or bending of the lid and the rail.

The pressure vessel can have a (circumferentially closed) pressure vessel wall surrounding the reaction chamber, with the rail being rigidly connected to the pressure vessel wall (as part of the pressure vessel and thus with the pressure vessel). In this way, it can, in particular, be ensured that the rail remains stationary relative to the pressure vessel wall while the lid is moved between the open position and the closed position. The operability of the pressure vessel system can in this way be improved, especially because of the less-stressed lid and the thus simpler raising of the lid.

The pressure vessel wall can have a drilled hole where the fluid conduit is fluidically connected at least via the second connection and the drilled hole and preferably via a further drilled hole present in the lid to the reaction chamber. A particularly good fluidic connection between rail or fluid conduit and reaction chamber can thus be provided. If the further drilled hole is also provided, a fluid from the fluid conduit can advantageously be introduced from above the reaction chamber into the reaction chamber, while the rail or the fluid conduit is provided at the side of the reaction chamber in a space-saving manner.

The pressure vessel system can have a fastening device for fastening the rail to the pressure vessel or the part of the pressure vessel, preferably to the pressure vessel wall and/or the lid. The fastening device thus provides the rigid connection between rail and pressure vessel and can bring about a self-sealing fluidic connection between the rail and the pressure vessel or the reaction chamber, i.e. without further sealing elements. The fastening device is preferably configured so that the fluid conduit is fluidically connected via the second connection and the fastening device, for example via a through-hole running through the fastening device, to the reaction chamber. The fastening device can thus provide both the mechanical connection and the fluidic connection between rail and pressure vessel system. This can reduce the outlay for assembly and further optimize the construction space.

The pressure vessel system can also comprise a control device for controlling devices fluidically connected to the rail and/or for controlling the movement of the lid or the rail, in particular the transport device.

The control device is preferably configured for feeding a fluid for flushing the fluid conduit via the first connection into the fluid conduit. Owing to the particularly simple, in particular short and straight, configuration of the rail or the fluid conduit, the fluid conduit and the connections fluidically connected to the fluid conduit can thus be flushed particularly efficiently, especially using only a flushing stream controlled by the control device, for example with a loading fluid for applying pressure (for the pressure reaction) to the reaction chamber. The fluid conduit and the connections or devices which are fluidically connected to the fluid conduit are consequently freed effectively of, in particular, aggressive chemicals (condensations, residues, etc., in particular HCl, chlorine, hydrofluoric acid). The control device is particularly preferably able to move, before flushing, the lid in the direction of the open position so that the lid is less open during flushing of the fluid conduit than in the open position. Flushing with an open lid serves, in particular, to bring about more effective flushing of the entire reaction chamber and the lid, while no chemicals are squirted out of the reaction chamber due to the lower accessibility of the reaction chamber from the outside (especially only a few centimeters) compared to the open position; rather, only the flushing fluid and the materials flushed out by the flushing fluid escape in this position of the lid.

The pressure vessel system preferably comprises a valve which is (fluidically) connected to the third connection, with the control device being able to open the valve before flushing, so that a pressure prevailing in the reaction chamber is reduced. The pressure reduction by means of the valve thus brings about preflushing before the actual flushing by means of the fluid introduced via the fluid conduit. Furthermore, the decrease in pressure brought about by the valve can enable the fluid for flushing the fluid conduit and/or the reaction chamber to be introduced particularly simply and thus flush at least the fluid conduit and preferably also the reaction chamber particularly efficiently. For a particularly efficient flushing operation, preference is given to the control device being configured for closing the valve before movement of the lid in the direction of the open position. The fluid for flushing can in this way flow particularly readily through the fluid conduit and into the reaction chamber in order to flush these.

The at least one third connection can be integral with the rail. In particular, this means that no further parts which are movable relative to the rail need to be provided for fluidically connecting or fastening the respective device. The respective device can thus be fluidically connected particularly simply to the rail and consequently also to the reaction chamber.

The at least one third connection preferably has a fastening structure such as a drilled hole, in particular a through-hole, for fastening the device. The fastening structure preferably has a fastening region, in particular a fastening region corresponding to the device, for example a thread and/or a snap connection, for fastening, preferably for frictional fastening and/or positive locking, of the device to the third connection. The respective device can thus be rigidly connected particularly simply to the at least one third connection or be fastened to this.

The at least one third connection is preferably able to connect the device to the rail in an assembly direction, with the assembly direction being essentially perpendicular to a flow direction of the fluid conduit. This is particularly advantageous for particularly good removal of chemicals, solvent residues, etc., especially in the form of droplets, adhering inside the fluid conduit and/or to or in the third connection. This means that the fluid conduit and also the third connection are particularly readily accessible for removing the materials adhering to these. For example, the assembly direction is the direction of extension of the fastening structure, in particular the drilled hole.

The rail has at least two, preferably three, four, five or six or more, third connections. The rail can in principle have any number of third connections. The at least two third connections are preferably provided on the same side of the rail relative to the pressure vessel, particularly preferably on a side of the rail facing away from the pressure vessel. The at least two third connections are in this way arranged so as to be particularly readily accessible and space-saving.

The first connection can be able to be fluidically connected to a compressor. The compressor can thus feed a compressed fluid via the first connection into the reaction chamber. The pressure vessel system preferably has a compressor which is fluidically connected to the first connection in order to feed a (compressed) fluid into the reaction chamber.

The pressure vessel system can comprise a nonreturn valve which is provided upstream of the first connection and is preferably provided between the first connection and the compressor. The nonreturn valve is able to block flow out from the first connection in the direction of the compressor. The nonreturn valve prevents, in particular, backward diffusion and thus protects the fluid or gas supply and the compressor.

The pressure vessel system can further comprise a buffer having a defined intrinsic volume provided upstream of the first connection, preferably upstream of the nonreturn valve, particularly preferably between the first connection or nonreturn valve and the compressor, for buffering fluid flowing out from the compressor in the direction of the first connection. The buffer provides additional protection for the pressure vessel system, since it automatically flushes or reflushes at least the fluid conduit of the rail by means of its intrinsic volume when the pressure in the reaction chamber is reduced, for example by pressure equilibration with the ambient pressure. The buffer accordingly serves as a type of flushing vessel which automatically flushes as a result of its pressure or loading pressure.

The buffer preferably has a filter for filtering fluid flowing out from the compressor in the direction of the first connection. The filter ensures, in particular, that the fluid flowing in the direction of or into the reaction chamber does not contain any unwanted constituents such as particles or impurities; the unwanted constituents are thus particularly readily filtered out of the fluid flowing in the direction of the first connection by means of the filter.

The pressure vessel system can have a further nonreturn valve provided upstream of the buffer, preferably between the buffer and the compressor, with the further nonreturn valve being able to block flow out of the buffer in the direction of the compressor. Backward diffusion can be particularly readily prevented in this way and the fluid or gas supply and the compressor can thus be protected particularly well.

The rail can be made of a high-pressure-resistant material, preferably in such a way that the rail can withstand the pressures prevailing in the reaction chamber for initiating and/or promoting chemical and/or physical pressure reactions, especially pressures in the range of up to at least 200 bar, preferably up to at least 500 bar, prevailing in the fluid conduit.

The rail can be made of a chemically resistant material and/or the fluid conduit can have a chemically resistant lining, in particular a coating and/or a hose, with the lining preferably being made of polymer, particularly preferably PTFE (polytetrafluoroethylene). The fluid conduit can thus be used, in particular, for conveying particularly aggressive chemicals such as hydrofluoric acid. The chemically resistant material and/or the chemically resistant lining result(s), in particular, in the fluids flowing through the fluid conduit not chemically and/or physically changing or damaging the fluid conduit, i.e. the fluid conduit not being, in particular, degraded (corrosion, etc.).

The rail is preferably made of metal. To allow particularly simple production of the rail, the rail is preferably made of a block, preferably a single block.

The wall thickness of the rail is preferably greater than the cross section of the fluid conduit, i.e., for example, greater than the height and/or width of the cross section, in particular greater than the diameter, of the fluid conduit. In other words, the rail is preferably thick-walled in order to give the rail its rigid structure. In this way, a particularly resistant rail can be provided in order to withstand, in particular, the prevailing pressures and reliably fluidically connect the at least one device via the at least one third connection.

The rail can be elongated, i.e., in particular, have a longitudinal axis running in the direction of the fluid conduit. Here, elongated means that the length of the rail corresponds to a multiple of the width of the rail.

The rail can have a round or angular (or polygonal) cross section, preferably a rectangular or square cross section. An advantage of an angular cross section is, in particular, that it generally has a straight section and can thus be particularly simply connected mechanically to the pressure vessel via such a flat region of the rail.

The fluid conduit preferably has only one direction of extension. The fluid conduit in the rail can thus be provided particularly simply, for example by the fluid conduit being drilled in only one direction in the rail in order to provide the fluid conduit.

The pressure vessel system preferably further comprises at least one device which is (fluidically) connected to the at least one third connection and particularly preferably borne by the rail. The device can have a valve, in particular a valve for the preferably linear or abrupt reduction of pressure prevailing in the reaction chamber. The valve can be employed, for example, as emergency blowing-off valve as a result of the configuration of the valve for abrupt reduction of pressure. The device can have a pressure measuring device (for example a pressure gauge and/or an electric pressure sensor) for measuring pressure (in particular in a range of 0-400 bar) prevailing in the reaction chamber. The device can have a pressure safety device such as a bursting valve, in particular a bursting membrane, with the pressure safety device preferably having a disk-like shape. The pressure safety device ensures, in particular, that the pressure vessel system, in particular the pressure vessel, is not unintentionally damaged as a result of excessively high pressures.

4. BRIEF DESCRIPTION OF THE DRAWINGS

Figure 2:
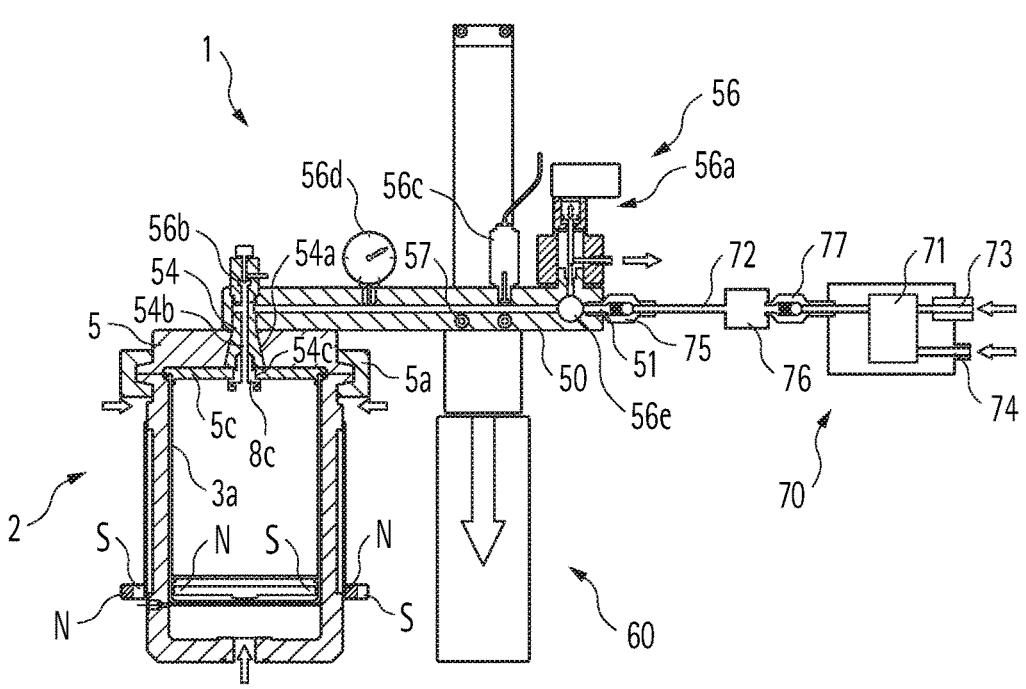
Figure 3A:
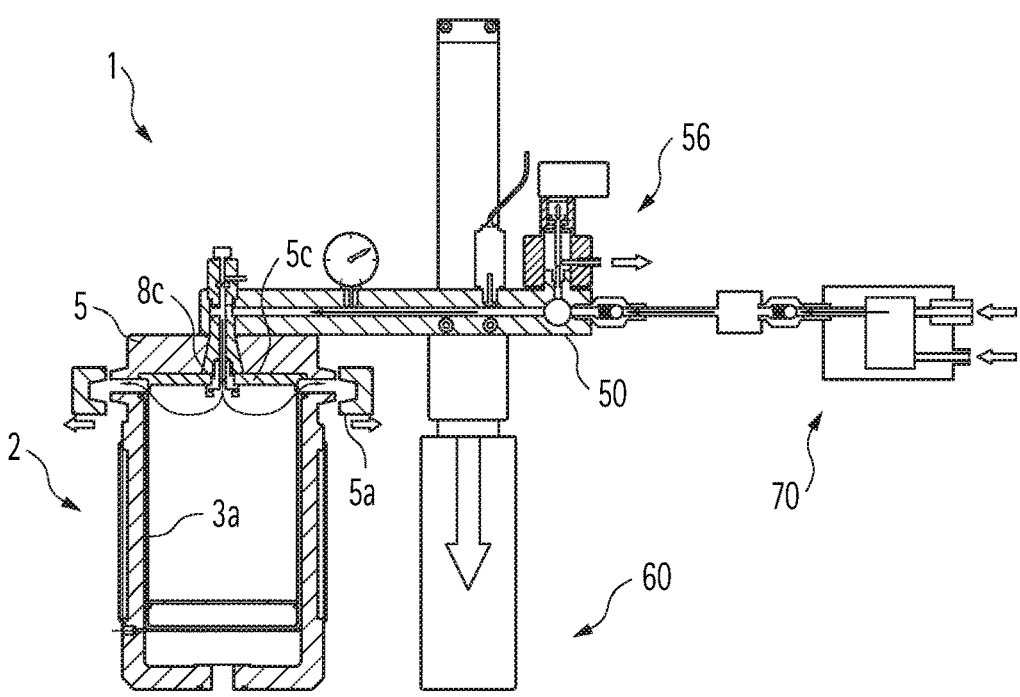
Figure 3B:
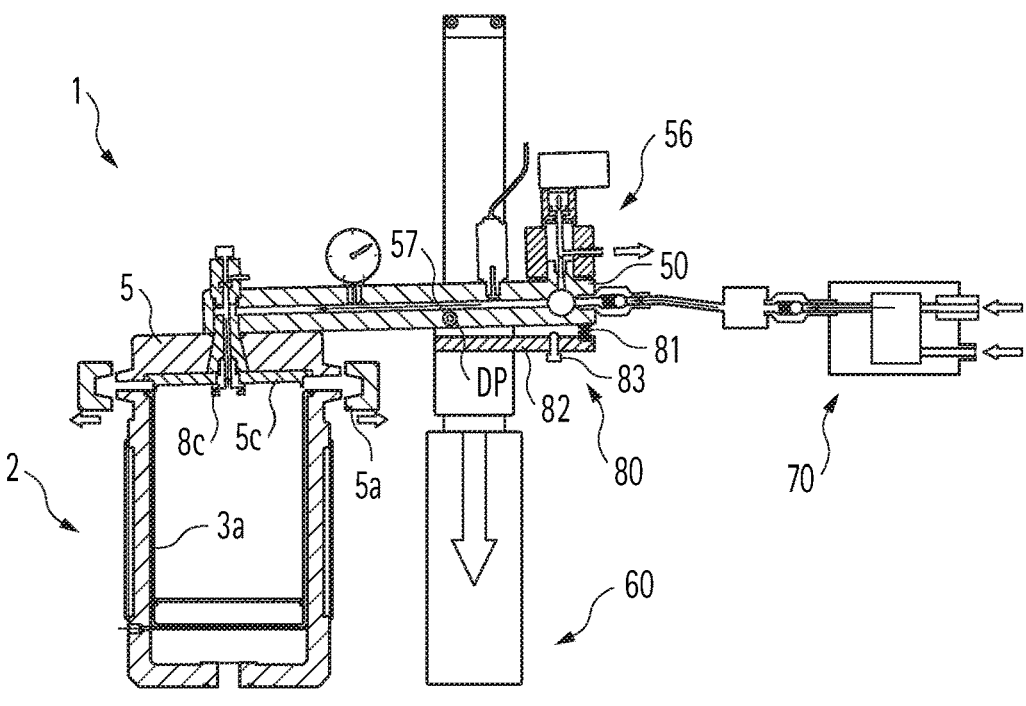
Figures 4, 5:
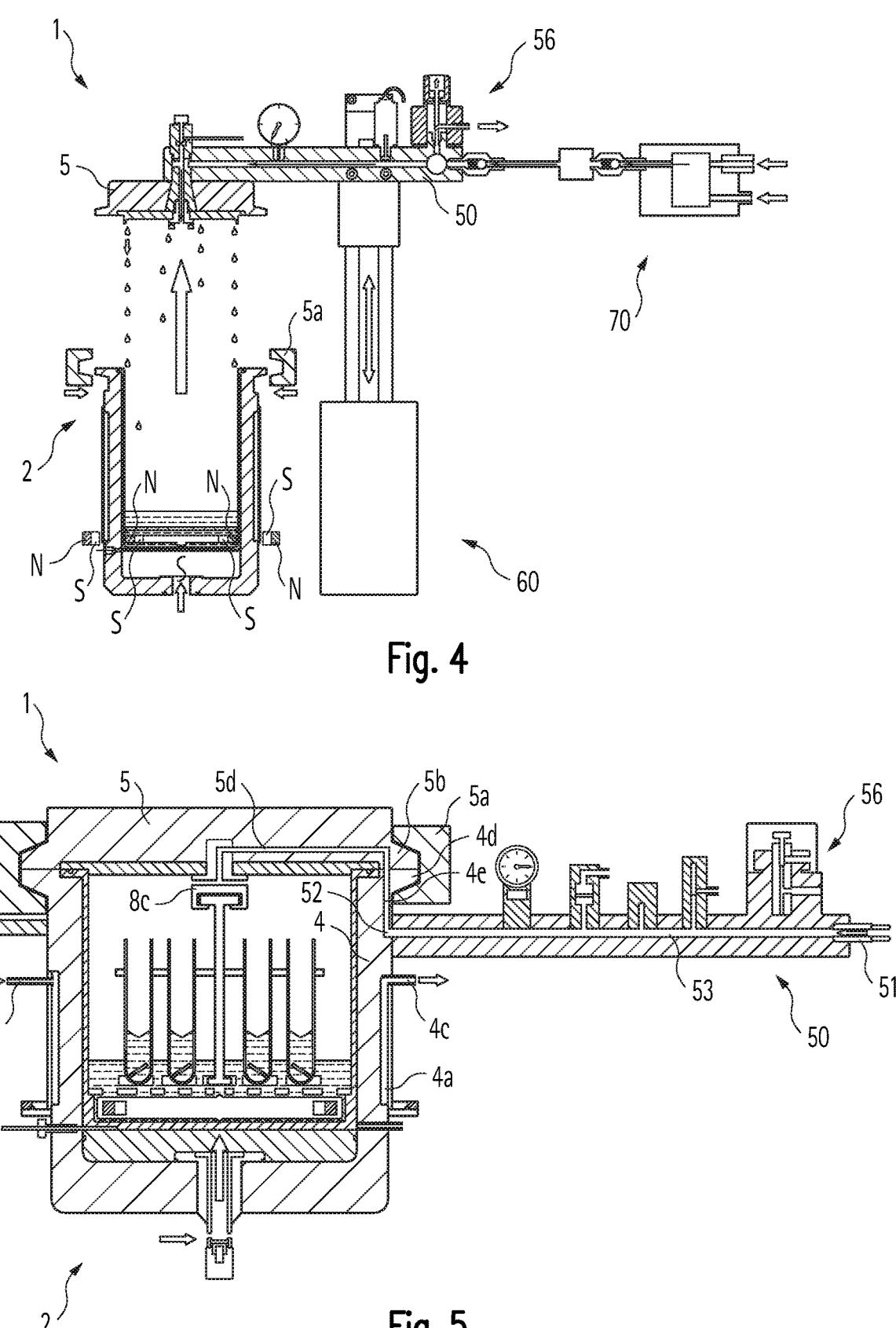

A detailed description of the figures will be given below. The figures show:

FIG. 1 a schematic sectional view of a preferred first embodiment of a pressure vessel system according to the invention;

FIG. 2 a schematic sectional view of a preferred further development of the embodiment shown in FIG. 1, in which the lid is in the closed position;

FIG. 3A a schematic sectional view of the embodiment shown in FIG. 2, with the lid being between the closed position and the open position;

FIG. 3B the embodiment shown in FIG. 2 with a preferred embodiment of a sensor for recognizing the closed position or open position of the lid;

FIG. 4 a schematic sectional view of the embodiment shown in FIGS. 2 and 3A, in which the lid is in the open position; and FIG. 5 a schematic sectional view of a preferred second embodiment of a pressure vessel system according to the invention.

DETAILED DESCRIPTION OF THE PREFERRED EMBODIMENTS

The figures show, by way of example, various embodiments of a pressure vessel system according to the invention. FIG. 1 shows, by way of example, a first embodiment of a pressure vessel system 1 according to the invention. The pressure vessel system 1 comprises a pressure vessel 2 having a reaction chamber 3 as pressure space for initiating and/or promoting chemical and/or physical pressure reactions of samples P accommodated in the reaction chamber 3. The sample P comprises, for example, solids (inorganic and/or organic) such as sand, soil, earth and/or leaves. However, the pressure vessel 2 is not restricted to a particular sample P. In particular, any type of samples can be subjected to a pressure reaction in the pressure vessel 2, especially samples having a high viscosity or many solid constituents.

The pressure vessel 2 can be a (high-pressure) autoclave. The pressure vessel 2 preferably consists of a high-pressure-resistant material such as metal, preferably steel, particularly preferably a corrosion-resistant stainless steel alloy. The pressure vessel 2 is preferably configured so that it can be used at pressures up to at least 200 bar, preferably up to at least 500 bar, and/or at temperatures of up to and also above 300° C.

The pressure vessel 2 preferably surrounds the reaction chamber 3 on all sides. The pressure vessel 2 preferably has a pressure vessel wall 4 which (completely) circumferentially surrounds the reaction chamber 3 and defines an opening through which the samples P for sample treatment can be introduced into the reaction chamber 3 and removed again from the latter. The pressure vessel wall 4 thus forms a preferably pot-shaped lower part of the pressure vessel 2 (pressure tank). The pressure vessel wall 4 is preferably configured as cooling jacket for cooling the reaction chamber 3 in order, for example, to maintain a constant temperature for heating the samples P. The pressure vessel wall 4 preferably has at least one cooling conduit 4a for cooling by means of the pressure vessel wall 4. The conduit 4a preferably has a cooling liquid for cooling by means of the pressure vessel wall 4. The cooling liquid is preferably introduced into the conduit 4a via an inlet 4b and discharged from the cooling conduit 4a via an outlet 4c. The cooling liquid preferably circulates in the cooling conduit 4a.

The pressure vessel 2 preferably has a lid 5 which can be moved between an open position and a closed position. In the open position, the reaction chamber 3 is opened, in particular in order to introduce the samples P into the reaction chamber 3 through the abovementioned opening formed in the pressure vessel wall 4 and take them out again.

In the open position, which can be seen by way of example in FIG. 4, the condensates (aggressive chemicals, etc.) adhering to the lid 5 or to the lid part 5c described in more detail below, for example in the form of droplets, can fall into the pressure vessel 2 or the reaction chamber 3 without attacking parts of the pressure vessel 2 or of the pressure vessel system 1 located at the side of the reaction chamber 3. In the closed position, the reaction chamber 3 is closed in order to carry out, for example, the pressure reaction on the samples P. The pressure vessel 2 preferably has a closing element 5a which closes the lid 5 with the pressure vessel wall 4 in the closed position. The closing element 5a can, for example, be configured for pressing the lid 5 onto the pressure vessel wall 4 so as to form a seal in the closed position. Pressure vessel wall 4 and lid 5 preferably each have a flange region 4d or 5b which are surrounded in the closed position by the closing element 5 in order to close the reaction chamber 3 by means of the lid 5, for example by pressing the lid 5 against the pressure vessel wall 4. The closing element 5a is, for example, configured as a clamp which preferably has two clamp halves which can be moved relative to one another for opening and closing the clamp in order to move the clamp away from the pressure vessel 2 (open position) or apply the clamp to the pressure vessel 2 (closed position).

The pressure vessel 2 or the reaction chamber 3 is preferably configured for accommodating a liquid or base load 6. The liquid 6 is preferably a liquid which strongly absorbs microwaves. The liquid 6 is, in particular, provided in order to heat or warm the samples P present in the pressure vessel 2 or in the reaction chamber 3. This can, for example, be effected by the respective sample P being at least partially surrounded by the liquid 6 and a microwave generator (magnetron, etc.), which is not shown in more detail, heating the liquid 6 by absorption of microwaves. The samples P can thus be indirectly heated or warmed via the liquid 6. As an alternative or in addition, other heat sources can also be employed for heating or warming the liquid 6 or samples P. Instead of indirect heating or warming of the samples P, these can also be heated or warmed directly by means of the abovementioned heat sources, i.e. without the liquid 6.

The sample P can be provided in a sample container 7, for example in a test tube. The pressure vessel 2 or the reaction chamber 3 is preferably configured for accommodating at least two samples P or sample containers 7. The pressure vessel 2 can also have a sample holder 8 by means of which the sample container 7 can be held in the reaction chamber 3. The sample holder 8 preferably supports the at least one sample container 7 in such a way that the sample container 7 and thus the sample P are present in the liquid 6. The sample holder 8 preferably has a holding device 8a by means of which the sample holder 8 can be mechanically connected to the pressure vessel 2. For example, the holding device 8a is configured for being mechanically connected to the lid 5, for example on the side of the lid 5 facing the reaction chamber 3. The holding device 8a can have a frictional and/or positively locking fastening device for fastening the sample holder 8 to the pressure vessel 2, i.e., in particular, to the lid 5. This fastening device is preferably configured for mechanically connecting the sample holder 8 via a corresponding connection to the pressure vessel 2. For example, the holding device 8a has a suspension device 8b which can be hung into a correspondingly configured accommodation device 8c on sides of the pressure vessel 2, in particular on sides of the lid 5, in order to provide the sample holder 8 correctly. The suspension device 8b is preferably configured as a sliding and/or linear guide, particularly preferably as what is known as a swallow-tail guide.

The pressure vessel 2 can also have a stirring device 9 for stirring the liquid 6. Homogeneous mixing and consequently a homogeneous temperature distribution and efficient heating of the liquid 6 accommodated in the reaction chamber 3 can be effected by means of the stirring device 9. The samples P are thus also heated more efficiently. The stirring device 9 preferably has a stirrer 9a which can be rotated about an axis of rotation, for example the pressure vessel axis or the tank axis, and is provided in the liquid 6 for stirring the liquid 6. The stirrer 9a is preferably driven by a drive element 9b. For example, the stirrer 9a can be configured as a magnetic disk and/or comprise magnetic elements (fixed magnets, magnetic bars, etc.). The magnetic elements can, for example, be accommodated in the stirrer 9a. In this way, the stirrer 9a carries the magnetic elements so that the magnetic elements rotating about the axis of rotation also rotate the stirrer 9a about the axis of rotation. The stirrer 9a is preferably made of a highly resistant material such as a polymer (PTFE, etc.). Particular preference is given to the magnetic elements being welded (in a sealed manner) in the highly resistant material.

The drive element 9b can be configured so that it interacts magnetically with the magnetic stirrer 9a in such a way that the stirrer 9a is made to rotate about the axis of rotation and thus stir the liquid 5. The drive element 9b preferably comprises magnets (fixed magnets, etc.) in order to interact with the stirrer 9a so as to stir the liquid 6. The drive element 9b thus preferably generates a magnetic field rotating about the abovementioned axis of rotation, as a result of which the magnetic stirrer 9a is likewise made to rotate about the axis of rotation by the magnetic interaction with the rotating magnetic field. For example, the magnets of the drive element 9b are provided in a holder, for example a rotary disk, which can be rotated relative to the pressure vessel 2 and about the axis of rotation in order to generate the rotating magnetic field by means of the rotating holder. The rotary holder can be mounted in a rotatable fashion on a correspondingly configured rotary bearing. The drive element 9b is preferably provided outside and/or at the side of the reaction chamber 3, particularly preferably outside and/or at the side of the pressure vessel wall 4.

The respective sample container 7 can have a stirring magnet 10 for stirring the sample P accommodated in the sample container 7. The stirring magnet 10 is preferably elongated, particularly preferably configured as a magnetic stirrer bar. The stirring magnet 10 is preferably provided so that the stirring magnet 10 is made to move by the rotating magnetic field of the magnetic stirrer 9a and/or by the magnetically driven drive element 9b in order to stir the sample P. If the sample P is stirred by the stirring magnet 10, samples having a high viscosity or a large proportion of solids, in particular, can be efficiently homogenized.

The pressure vessel 2 preferably has a liquid-permeable plate 14, in particular a perforated plate, which is provided in the liquid 6 and together with the reaction chamber 3 defines a space in which the stirrer 9a is accommodated. The plate 14 is preferably made of a microwave-absorbing material such as SiC and/or ceramic in order to be heated by microwave radiation and consequently warm or heat the liquid 6 (indirectly). In this way, the liquid 6 and consequently also the respective sample P are efficiently heated.

The pressure vessel 2 can have an inner vessel 3a which forms the reaction chamber 3 or at least a lower part of the reaction chamber 3. The inner vessel 3a preferably rests on a support 3b provided in the pressure vessel 2. The inner vessel 3a is preferably made of an inert material, for example polymer, in particular PTFE. The support 3b is preferably configured as a sealing element in order to seal the bottom region of the pressure vessel 2 from the outside. The support 3b is preferably pressure-rated. The support 3b is preferably made of polymer, in particular PTFE, silica, sapphire and/or calcium fluoride.

The pressure vessel 2 preferably has a lid part 5c which is present on sides of the lid 5 or on the side of the lid 5 which faces the reaction chamber 3 and closes off (so as to form a seal) the inner vessel 3a, in particular the opening thereof, in the closed position of the lid 5. The lid part 5c preferably has a circumferential, in particular ring-shaped, periphery which extends in the direction of the reaction chamber 3. As can readily be seen in FIG. 4, this periphery ensures, in particular, that the condensates adhering to the lid part 5c fall only into the reaction chamber 3, i.e. do not run out sideways over the reaction chamber 3. Safe dripping-off of the condensate is thus brought about by the periphery, as a result of which the safety of the pressure vessel system 1 is improved. As an alternative or in addition to such a periphery, it is also conceivable for the side of the lid part 5c facing the reaction chamber 3 to be tapered in the direction of the reaction chamber 3, for example in the manner of a (truncated) cone, in order to bring about safe dripping-off of the condensates on the lid part 5c into the reaction chamber 3. The lid part 5c is preferably made of polymer, in particular PTFE.

The pressure vessel 2 can comprise a temperature measuring device 11 for measuring or detecting the temperature of the samples P. For example, the temperature measuring device 11 comprises an infrared temperature sensor for measuring the temperature of the samples P. The temperature measuring device 11 is preferably provided on sides of a lower part or bottom region of the pressure vessel 2. The temperature measuring device 11 is preferably present below the bottom region and/or in the bottom region of the pressure vessel 2. The pressure vessel 2 can also comprise a (further) temperature measuring device 12 for measuring or detecting the temperature prevailing below the bottom of the reaction chamber 3, preferably (directly) below the (bottom of the) inner vessel 3a. The temperature measuring device 12 preferably comprises a thermocouple for measuring the abovementioned temperature, with the thermocouple preferably being inserted from the side into the pressure vessel wall 4.

The pressure vessel system 1 can have a plate 13 which accommodates the pressure vessel 2 in such a way that the lid 5 or the entry into the reaction chamber 3 is provided on sides of a front side of the plate 13 and the important components for operating the pressure vessel 2 or the pressure vessel system 1 (electric, electronic and/or mechanical components, etc., in particular the cooling conduits 4a, the drive element 9b and/or the temperature measuring device(s) 11 and/or 12) are provided on sides of a rear side of the plate 13. These important elements are thus efficiently electrically and mechanically shielded, in particular sealed, from the front side of the plate 13.

The pressure vessel system 1 also has a rigid rail 50 which is rigidly connected to at least part of the pressure vessel 2 or to the pressure vessel 2. The rail 50 is preferably elongated, i.e. preferably has a longitudinal axis which preferably runs horizontally in the pressure vessel system 1 shown by way of example in the figures. However, the longitudinal axis can also run vertically or in an axis at an angle to the horizontal.

In the preferred first embodiment of the pressure vessel system 1 shown in FIGS. 1 to 4, the rigid rail 50 is rigidly connected to the lid 5 as part of the pressure vessel 2, i.e. to the pressure vessel 2. The rail 50 has a first connection 51 for inflow of fluid and a second connection 52 for outflow of fluid. Furthermore, the rail 50 has a fluid conduit 53 which fluidically connects the first connection 51 to the second connection 52. The fluid conduit 53 here is formed by a hollow space, for example a drilled hole (when reference is made to a "drilled hole" in the context of the invention, this generally means any in-principle comparable (through) opening), in the rigid rail 50, with this hollow space (fluidically) connecting all connections 51, 52, 55 to one another and thus forms the fluid conduit 53 connecting the connections. The fluid conduit 53 or the hollow space is consequently integral with or integral in the rigid rail 50. The fluid conduit 53 is fluidically connected via the second connection 52 to the reaction chamber 3. In the preferred pressure vessel system 1 shown in FIGS. 1 to 4, the second connection 52 is accordingly provided on sides of the lid 5, i.e. in such a way that the fluid flowing out from the second connection 52 flows out over the lid 5 into the reaction chamber 3. In a corresponding way, a fluid from the reaction chamber 3 can also be introduced via the lid 5 and the second connection 52 into the fluid conduit 53.

As can be seen, in particular, from FIGS. 2 to 4, a fastening device 54 can be provided for fastening the rail 50 to the lid 5 in order thus to provide, in particular, the rigid connection between lid 5 and rail 50. The fastening device 54 can be configured for frictionally fastening and/or positively locking the rail 50 to the lid 5. The fastening device 54 is preferably passed through the lid 5 from a side of the lid 5 facing the reaction chamber 3, i.e. from an inner side of the lid 5, in order to be connected to the rail 50 on a side of the lid 5 facing away from the reaction chamber 3, i.e. an outer side of the lid 5, in order to fasten the rail 50 to the lid 5. The fastening device 54 is preferably configured for pressing the rail 50 against the lid 5 in order to connect the rail 50 rigidly (mechanically) to the lid 5 or fasten it to the latter. This can be effected, for example, by the fastening device 54 being provided so that the fastening device 54 pulls the rail 50 in the direction of the reaction chamber 3 and thus presses it against the lid 5. The fastening device 54 preferably has a (conical) outer surface 54a which, on fastening the rail 50 to the lid 5, positively locks and/or frictionally connects to the lid 5. A counterforce for fastening the rail 50 to the lid 5 can be applied via this outer surface 54a so that the lid 5 is clamped between rail 50 and fastening device 54 or the outer surface 54a thereof.

To obtain a particularly compact arrangement, the fluid conduit 53 is preferably fluidically connected via the second connection 52 and the fastening device 54 to the reaction chamber 3. For example, the fastening device 54 has a through-hole 54b running through the fastening device 54, via which hole a fluidic connection between the reaction chamber 3 and the second connection 52 or fluid conduit 53 can be provided. The through-hole 54b is preferably formed centrally in the fastening device 54, i.e., for example, flush with the axis of symmetry of the fastening device 54.

The fastening device 54 can also have a fastening region 54c via which the sample holder 8, in particular the holding device 8a or accommodation device 8c thereof, can be fastened to the fastening device 54 and thus the lid 5. The lid part 5c is preferably fastened to the lid 5 at the same time by fastening of the holding device 8a or the accommodation device 8c to the lid 5, preferably by the holding device 8a or the accommodation device 8c pressing the lid part 5c against the lid 5. The holding device 8a or the accommodation device 8c preferably fixes the lid part 5c in a defined position relative to the lid 5. The fastening of the lid part 5c to the lid 5 by means of the holding device 8a or the accommodation device 8c can, for example, be effected by frictional connection and/or positive locking, for example by means of a corresponding connection (snap connection, etc.) and/or a screw connection. If the sample holder 8 is mechanically connected via the holding device 8a or the accommodation device 8c to the fastening device 54, the through-hole 54b can be fluidically connected via the holding device 8a or the accommodation device 8c to the reaction chamber 3, preferably via a drilled hole running through the accommodation device 8c, in particular a through-hole. The latter through-hole is preferably branched, for example with an inlet and two outlets opening into the reaction chamber 3 (cf. FIG. 1) in order to release a fluid exiting from the second connection 52 uniformly into the reaction chamber 3.

The fluid conduit 53 preferably extends along the longitudinal axis of the rail 50. For example, the fluid conduit 53 has only one direction of extension, i.e. preferably extends only straight, for example only along the longitudinal axis of the rail 50. The fluid conduit 53 preferably has a first end and a second end, with the first end of the fluid conduit 53 having the first connection 51 and the second end having the second connection 52.

The rail 50 also has at least one third connection 55 which is fluidically connected to the fluid conduit 53, i.e. opens into the latter. The third connection 55 is preferably provided at any position along the longitudinal axis of the rail 50. For example, viewed perpendicularly to the longitudinal axis of the rail 50, the third connection 55 can be provided between the first connection 51 and the second connection 52 or coincidently with the first connection 51 or the second connection 52. At least one device 56 can be fluidically connected via the at least one third connection 55 to the fluid conduit 53, so that the device 56 is fluidically connected to the fluid conduit 53 and thus to the reaction chamber 3. It is advantageous here that only one third connection 55, which can be optimally sealed using appropriate sealing elements (sealing rings, etc.) is necessary for a device 56. The device 56 can, for example, have functions for which a fluid connection to the reaction chamber 3 is necessary, for example in order to measure and/or change particular values in the reaction chamber 3. Preferred devices 56 will be discussed in more detail below.

The rail 50 preferably has at least two, three, four, five, six or more third connections 55 in order to fluidically connect a corresponding number of devices 56 to the fluid conduit 53. The at least two or more third connections 55 are preferably distributed along the longitudinal axis of the rail 50. The at least two connections 55 are preferably provided on the same side relative to the pressure vessel 2, particularly preferably on a side facing away from the pressure vessel 2, i.e. above the pressure vessel 2 or the lid 5 in the pressure vessel system 1 shown by way of example in FIGS. 1 to 4. Adjacent third connections 55 can be at equal distances from one another, but can also have different distances from one another.

The at least one third connection 55 (or each of the at least two third connections 55) is preferably integral with the rail 50. The at least one third connection 55 can have a fastening structure such as a drilled hole, in particular a through-hole, via which the respective device 56 can be fastened to the rail 50. The fluidic connection between the respective device 56 and the fluid conduit 53 is preferably also established via this fastening structure or drilled hole. The drilled hole preferably has a fastening region which corresponds, in particular, to the respective device 56, for example by this fastening region having a thread and/or a snap connection. The respective device 56 can consequently be fastened to the third connection 55 and thus to the rail 50 via this fastening region, for example via a frictional connection and/or positive locking.

The at least one third connection 55 is preferably configured for connecting the respective device 56 in an assembly direction to the rail 50, with the assembly direction being essentially perpendicular to a flow direction of the fluid conduit 53. In the working example of the pressure vessel system 1 shown in the figures, the assembly direction runs perpendicular to the longitudinal axis of the rail 50, i.e., in particular, in a vertical direction. The assembly direction is preferably the direction of extension of the abovementioned drilled hole; i.e. the drilled hole preferably determines the assembly direction.

The at least one device 56 which is fluidically connected to the at least one third connection 55 can be a valve. This valve can be provided for decreasing a pressure prevailing in the reaction chamber 3. For example, the valve is a valve 56a for preferably linearly decreasing pressure prevailing in the reaction chamber 3 (i.e. for optional pressure release or closure), for example configured as an electric and/or electrically controllable valve 56a having automatic pressure relief. The valve 56a preferably has a setting element, in particular a setting and regulating motor, in order to close the valve 56a or open it for release of pressure, as desired. The valve can also be a valve 56b for preferably abruptly decreasing pressure prevailing in the reaction chamber 3, for example in the form of an emergency blowing-off valve. The valve 56b or the third connection 55 thereof is preferably provided so that, viewed from the top down onto the pressure vessel 2, i.e. a view onto the side of the lid 5 facing away from the reaction chamber 3, the valve 56b essentially coincides with the second connection 52. In this way, a particularly good or short fluidic connection between valve 56b and second connection 52 or reaction chamber 3 can be provided in order to decrease the pressure prevailing in the reaction chamber 3 particularly effectively and quickly or equilibrate this with the ambient pressure of the pressure vessel 2.

The apparatus 56 can also have a pressure measuring device which is configured for measuring the pressure prevailing in the reaction chamber 3. The pressure measuring device comprises, for example, an electric, preferably piezoelectric, pressure measuring device 56c which can indicate the corresponding pressure, preferably via a digital display, and/or transmit the pressure in digital form, for example for controlling and/or regulating the pressure in the reaction chamber 3. As an alternative or in addition, the pressure measuring device can comprise an analog pressure measuring device 56d which indicates the corresponding pressure in the form of an analog or direct pressure display, for example in the form of a pressure gauge.

The device 56 can also have a pressure safety device 56e which is designed for ensuring that a particular pressure in the reaction chamber 3, which could damage the pressure vessel 2, is not exceeded. The pressure safety device 56e is preferably configured as a bursting valve, in particular as a bursting membrane, and/or has the shape of a disk. The pressure safety device 56e is preferably designed to open at a pressure of about 200 bar. In one working example, the pressure safety device 56e can also be provided in the fluid conduit 53 or in the immediate vicinity of the fluid conduit 53, for example with a direct fluidic connection to the third connection 55 of the valve 56a and/or to the first connection 51 (cf. FIG. 2).

The pressure vessel system 1 preferably has a reservoir which is not shown in more detail and into which fluid exiting from valve 56a, valve 56b and/or pressure safety device 56e (because of the release of pressure) can escape. The reservoir has a large buffer volume in order to dampen the pressure impulse on release of pressure, so that the pressure vessel 2 is not stressed. The reservoir can be fluidically connected via appropriate fluidic conduits, for example a pressure-rated hose, to the valve 56a, valve 56b and/or the pressure safety device 56e.

FIGS. 1 to 4 show a preferred embodiment of the pressure vessel system 1 in which the rail 50 is configured and (mechanically) connected to the lid 5 in such a way that the lid 5 can be moved between the open position (cf. FIG. 4) and the closed position (cf. FIG. 2) by moving, preferably by raising and lowering, the rail 50, preferably together with the at least one device 56. Preference is given to a movement of the rail 50 perpendicular to the longitudinal axis of the rail 50 bringing about the abovementioned movement of the lid 5 between the open position and the closed position, i.e. a vertical movement (from the bottom upward or from the top downward) of the rail 50 in FIGS. 1 to 4.

The movement of the rail 50 for moving the lid 5 between the open position and the closed position can be effected manually and/or mechanically and/or automatically. The movement of the rail 50 for moving the lid 5 between the open position and the closed position is preferably effected mechanically, for example by means of a transport device 60, preferably by means of a raising and lowering device or lift as depicted by way of example in FIGS. 2 to 4. As indicated in each case by an arrow or double arrow in FIGS. 2 to 4, preference is given to the transport device 60 transmitting a linear movement to the rail 50 so that the latter can move the lid 5 between the open position and the closed position. The linear movement of the transport device 60 is preferably provided by linear guide elements such as a slider, preferably a lift sled which can be moved along a lift rod. The direction of movement of the linear movement of the transport device 60 is preferably perpendicular to the longitudinal axis of the rail 50, and thus preferably runs vertically. The transport device 60 preferably has a corresponding drive unit, for example an electric motor, via which the movement, i.e., in particular, the linear movement, for moving the lid 5 between the open position and the closed position can be brought about.

The transport device 60 is preferably provided at the side next to the pressure vessel 2. However, the transport device 60 can also be provided in another position relative to the pressure vessel 2, in which position the transport device 60 can move the lid 5 as described above by means of the rail 50. To fasten the rail 50 to the transport device 60, the rail 50 can have a fastening region 57.

The rail 50 can be fastened by frictional contact and/or positive locking to the transport device 60 via the fastening region 57. For example, the fastening region 57 is configured so as to correspond to a corresponding fastening region of the transport device 60. It is possible to provide fastening devices which fasten the fastening region 57 and thus the rail 50 to the transport device 60. Suitable fastening devices are, in particular, screws or the like.

The pressure vessel system 1 preferably has a control device which is not shown in more detail and is preferably configured so as to control the devices 56 fluidically connected to the rail 50 (in particular valves, (pressure) measuring devices, etc.) and/or the movement of the rail 50 for moving the lid 5 between the open position and the closed position, i.e., in particular, the transport device 60. The control device can also be configured for opening and closing the closing element 5*a*. For example, the control device can be configured for firstly opening the closing element 5*a* and subsequently controlling the transport device 60 so that the lid 5 is moved from the closed position in the direction of or into the open position. In an analogous way, the control device can be configured for closing the closing element 5*a* again (immediately) after the transport device 60 has moved the lid 5 into the closed position, so that, for example, a pressure reaction can subsequently be carried out in the reaction chamber 3.

FIG. 3B shows a particularly preferred embodiment of the pressure vessel system 1, in which the rail 50 can be moved relative to the transport device 60, i.e. in particular relative to a part of the transport device 60 which moves the rail 50 between the open position and the closed position, for example the abovementioned linear guide elements of the transport device, and relative to an axis (translatory axis, axis of inclination or axis of rotation, etc.), in particular can be inclined, for example about a point of rotation DP. The pressure vessel system 1 then also has a sensor 80 which is able to recognize the closed position of the lid 5 on the basis of a relative movement, in particular inclination movement, of the rail 50 relative to the transport device 60 and relative to the axis which is made possible by the abovementioned movability or ability to be inclined of the rail 50, with the relative movement being brought about by moving the lid 5 into the closed position. This relative movement can, for example, be recognized by a proximity sensor (distance sensor, nearness sensor, proximity switch, etc.) integrated into the sensor 80 and/or the elastic element 81 described in more detail below.

Thus, for example, the rail 50 can be inclined relative to the horizontal or vertical (for example by a small angle, in particular in the range from 1° to 5°, cf. FIG. 3B) in the closed position which has not yet been attained or in the open position and, as soon as the lid 5 arrives in the closed position, the lid 5 turns the rail 50 about the axis of inclination by placement on the opening to be closed and the sensor 80 thus detects the closed position at least on the basis of this rotation or inclination movement. During this movement of the lid 50 into the closed position, the lid 50 consequently is firstly located on a first section of the periphery of the pressure vessel wall 4 defining the opening to be closed (in FIG. 3B on the left-hand outer periphery of the pressure vessel wall 4), so that the lid 50 subsequently rests flat and completely on the periphery of the pressure vessel wall 4 defining the opening to be closed (i.e. in FIG. 3B also on the right-hand outer periphery of the pressure vessel wall 4). As can readily be seen in FIG. 2, the rail 50 is preferably not inclined relative to the transport device 60 in the closed position, i.e., for example, with its longitudinal axis parallel to the horizontal, in order, in particular, to lie flat on the opening to be closed or the pressure vessel wall 4, for example on the flange region 4*d*.

The closed position recognized by the sensor 80 can then be transmitted to the control device which then appropriately controls the pressure vessel system 1 on the basis of this detected closed position. For example, the control device can, after recognition of the closed position, control the closing element 5*a* so that the closing element 5*a* closes the lid 5 with the pressure vessel wall 4 in the closed position; subsequently, the control device can, for example, control appropriate components in order to carry out the pressure reaction in the reaction chamber 3.

As an alternative or in addition, the sensor 80 can be configured so as to recognize the open position of the lid 5 on the basis of a relative movement (counter to the above-described relative movement), in particular inclination movement about the point of rotation DP, of the rail 50. This correspondingly follows the recognition of the closed position, with the relative movement then being brought about by movement of the lid 5 into the open position. Thus, for example, the rail 50 and thus the lid 5 can rotate about the axis of inclination or the point of rotation DP as soon as the lid 5 leaves the closed position, and the sensor 80 consequently recognizes that the closed position or open position has been left at least on the basis of this rotation or inclination movement.

The sensor 80 is preferably able to measure a contact pressure force of the lid 5 for closing the reaction chamber 3 in the closed position as a result of the relative movement and recognize the closed position as soon as the contact pressure force exceeds a defined threshold contact pressure force. In other words, the sensor 80 can recognize an increasing contact pressure force with increasing displacement or decreasing inclination of the rail 50 relative to the transport device 60 or the horizontal. The sensor 80 thus recognizes, for example, a contact pressure force which exceeds the defined threshold contact pressure force as soon as the rail 50 is not inclined relative to the transport device 60 or has its longitudinal axis parallel to the horizontal (cf. FIG. 2).

In a particularly preferred embodiment, the sensor 80 comprises an elastic element (spring element, etc.) 81 which is compressed due to the relative movement of the rail 50 relative to the transport device 60, with the contact pressure force being measured by the sensor 80 on the basis of the compression of the elastic element 81 and/or on the basis of the restoration force brought about by the compression of the elastic element 81. The sensor 80 is preferably able to measure a current change in the drive (electric motor) of the transport device 60, with the measured current increasing with increasing compression of the elastic element 81 and the sensor 80 measuring an increase in force and consequently an increasing contact pressure force on the basis of this increasing current.

The sensor 80 can thus particularly simply draw conclusions as to the degree of opening or remaining closure of the pressure vessel 2. The elastic element 81 is preferably provided below the rail 50, for example on an element 82 which is preferably configured as a rod. The rail 50 can consequently preferably be inclined relative to the element 82, or the element 82 is preferably provided in a horizontal position. The element 82 can be rigidly connected to the linear guide elements, for example the slider or lift sled, so that the rail 50 can be moved or inclined relative to the element 82 in order to be able to interact functionally with the parts provided by the element 82.

The rail 50 can, for example, be driven to the position which is moved or inclined relative to the transport device 60 by the weight force of the rail 50 and/or the lid 5. As an alternative or in addition, the restoration force produced by the compression of the elastic element 81 can drive the rail 50 and thus the lid 5 into the position which is moved or inclined relative to the transport device 60.

The movability, preferably ability to be inclined, of the rail 50 relative to the transport device 60 is preferably provided via the fastening region 57. This means that the fastening region 57 is preferably configured firstly for fastening the rail 50 to the transport device 60 or to the linear guide elements so that the lid 5 can be moved between the open position and the closed position, and secondly for providing the relative movability or ability to be inclined of the rail 50 relative to the transport device 60. This can, for example, be effected by appropriate fastening devices for fastening the rail 50 to the transport device 60 being provided so that the degree of freedom for movement or inclination of the rail 50 relative to the transport device 60 and preferably about the point of rotation DP is provided. For example, these fastening devices fasten the rail 50 to the transport device 60 with a defined play, so that the relative movability between rail 50 and transport device 60 is provided.

Furthermore, a setting element 83 is preferably provided, for example in the form of a setting screw, where the setting element 83 is configured for setting the inclination of the rail 50 in the closed position and/or for serving as a stop for the rail 50 in the closed position. When the rail 50 rests on the setting element 83, the sensor 80 detects an additional (strong) increase in current in the drive of the transport device 60, and the sensor 80 recognizes the ultimate closed position (end detection) of the lid 50 on the basis of this additional increase in current. The setting element 83 is preferably able to incline the rail 50 somewhat relative to the horizontal in the closed position in order to compensate, for example, for tolerances of the pressure vessel 2 or the pressure vessel wall 4 defining the opening to be closed which are present, for example, in the closed position.

The control device can also be equipped for receiving values from the at least one device 56, in particular the pressure measuring devices 56*c* and/or 56*d*, and transmit them for further processing, for example for display. The control device can also be configured for controlling the valves 56*a* and/or 56*b* in order to control and/or regulate a particular pressure in the reaction chamber 3. The control device can also be configured for controlling other devices (for example the stirring device 9 and/or the cooling by means of the pressure vessel wall 4 and/or the heating device, in particular the microwave generator) for carrying out the pressure reactions on the samples P.

The rail 50 can be made of a high-pressure-resistant material, preferably so that the rail 50 withstands the pressures prevailing in the fluid conduit 53, i.e., in particular, a pressure in the reaction chamber 3 during a chemical and/or physical pressure reaction on the samples P. The pressures prevailing in the fluid conduit 53 are generally in the range up to at least 200 bar, preferably up to at least 500 bar. The rail 50 can, as an alternative or in addition, be made of a chemically resistant material and/or the fluid conduit 53 can have a chemically resistant lining such as a coating and/or a hose. The abovementioned lining can be made of a polymer, preferably PTFE. The wall thickness of the rail 50 is preferably greater than the cross section or the diameter of the fluid conduit 53 in order to provide a particularly good strength or stiffness for the intended use. When the rail 50 is used for moving the lid 5 between the closed position and the open position, for example by means of the transport device 60, the rail 50 or the material has a strength or stiffness corresponding at least to the load of the lid 5. The rail 50 can be made correspondingly smaller when it is not provided for moving the lid 5, for example in the case of the second embodiment of the pressure vessel system 1 described further below.

The rail 50 can be made of metal, in particular steel, preferably of a corrosion-resistant stainless steel alloy, particularly preferably 1.4571 steel or higher grade. The rail 50 can be made of a block, preferably a single block. (Metal) blocks which are, in particular, elongated are easy to provide or produce and thus particularly advantageous for simple production of the rail 50. The rail 50 preferably has, viewed in the direction of the longitudinal axis of the rail 50, an angular, in particular rectangular or square, cross section. This is advantageous particularly because the angular cross section, in particular a straight or flat region of the appropriate part of the rail 50, can easily be connected mechanically to the pressure vessel 2 to establish a rigid connection. In particular, a connection between rail 50 and pressure vessel 2 which cannot rotate about the longitudinal axis of the rail 50 can be produced by this rigid connection between rail 50 and pressure vessel 2. However, the rail 50 is generally not restricted to a particular cross section and can, for example, also have a round cross section. The rail 50 is preferably essentially uniform in terms of cross section along the longitudinal axis.

As can be seen, in particular, from FIGS. 2 to 4, a fluid can be fed to the fluid conduit 53 via the first connection 51, for example via a compressor 70 which is fluidically connected to the first connection 51 and thus the fluid conduit 53 and the reaction chamber 3. The first connection 51 is preferably the only connection of the rail 50 or the fluid conduit 53 via which a fluid is fed into the fluid conduit 53. Analogously, the second connection 52 is preferably the only connection of the rail 50 or the fluid conduit 53 via which a fluid is discharged from the fluid conduit 53 when valves of the rail 50 are closed.

To compress the fluid fed into the reaction chamber 3 by means of the compressor 70, the compressor 70 preferably has a compressor mechanism 71, for example a compressor device. The compressor 70 is preferably fluidically connected at least via a flexible connecting element 72, for example a hose, to the first connection 51. The connecting element 72 is preferably able to withstand a pressure of up to 200 bar, preferably in the range from 50 to 70 bar or in the range from 100 bar to 200 bar, particularly preferably a maximum of 100 bar or 200 bar. The flexible connecting element 72 is, in particular, also advantageous for the lid 5 which can be moved between the closed position and the open position, i.e., in particular, when a transport device 60 is present, since it allows relative movement between rail 50 and compressor 70. However, it is also conceivable, as an alternative or in addition, for the compressor 70, preferably including all components connecting the rail 50 to the compressor 70, to move together with the lid 5 during this movement of the lid 5, i.e. there is no relative movement between lid 5 and compressor 70.

The compressor 70 is preferably configured so as to change between a loading setting and a working setting. In the loading setting, the compressor 70 feeds a loading fluid or loading gas into the reaction chamber 3 in order, for example, to pressurize the reaction chamber 3 for a pressure reaction. The loading fluid is preferably provided via a first conduit 73 which is fluidically connected to the compressor mechanism 71. In the working setting, the compressor 70 feeds a working fluid or working gas, for example air, into the reaction chamber 3. The introduction of the working fluid is preferably carried out while a pressure reaction is taking place in the reaction chamber 3, for example in order to assist or maintain the pressure reaction. The working fluid is preferably provided via a second conduit 74 which is fluidically connected to the compressor mechanism 71. The compressor mechanism 71 is preferably able to provide, as desired, a fluidic connection between reaction chamber 3 and first conduit 73 or reaction chamber 3 and second conduit 74 in order to change between the loading setting and the working setting.

A nonreturn valve 75 can be provided upstream of the first connection 51, preferably between the first connection 51 and the compressor 70, which nonreturn valve is able to block flow out from the first connection 51 in the direction of the compressor 70. Preference is given to the downstream end of the nonreturn valve 51 being fluidically connected to the first connection 51 and the upstream end of the nonreturn valve 51 being fluidically connected to the downstream end of the flexible connecting element 72.

A buffer 76 which has a defined intrinsic volume for buffering fluid flowing out from the compressor 71 in the direction of the first connection 51 can be provided upstream of the first connection 51. The intrinsic volume of the buffer 76 is preferably in the range from 0.5 to 5 l. The buffer 76 preferably has such an intrinsic volume that fluid flowing from the compressor 70 into the buffer 76 has a pressure in the range from 10 to 70 bar, preferably in the range from 50 to 70 bar. If the buffer 76 is provided, this is charged by the compressor 70, in particular by the loading fluid thereof, in order to effect automatic flushing of the fluid conduit 53 and/or of the at least one third connection 55 and preferably the at least one device 56 (later) during depressurization of the reaction chamber 3. The buffer 76 is preferably provided upstream of the nonreturn valve 75, particularly preferably between the first connection 51 or nonreturn valve 75 and the compressor 70. The buffer 76 is preferably fluidically connected at its downstream end to the flexible connecting element 72, and the upstream end of the buffer 76 is preferably fluidically connected to the compressor 70.

A further nonreturn valve 77 is preferably provided upstream of the buffer 76. The further nonreturn valve 77 is configured for blocking flow from the buffer 76 in the direction of the compressor 70. The further nonreturn valve 77 is preferably provided between the buffer 76 and the compressor 71 and particularly preferably connected directly to this; the downstream end of the further nonreturn valve 77 is preferably fluidically connected to the upstream end of the buffer 76, with the upstream end of the further nonreturn valve 77 preferably being fluidically connected to the downstream end of the compressor 70.

The buffer 76 can have a filter, which is not shown in more detail, for filtering the fluid flowing out from the compressor 70 in the direction of the first connection 51 in order to filter out, in particular, unwanted constituents from the fluid fed to the reaction chamber 3 by the compressor 70. The buffer 76 can for this purpose be configured (for example as a result of a multipart configuration) for allowing access to the filter, for example for replacement and/or maintenance of the filter.

The control device is preferably configured for controlling the compressor 70 corresponding to the abovementioned functionality, i.e., in particular, for changing between the working setting and the loading setting and also for appropriate introduction of the respective fluids.

The control device can also be configured for feeding a fluid for flushing the fluid conduit 53 into the fluid conduit 53 via the first connection 51. This flushing is preferably carried out after the flushing effected by the buffer 76 has occurred or after the reaction chamber 3 has been depressurized. The fluid for flushing can, for example, be provided by the compressor 70. The control device is preferably configured for moving the lid 5 (somewhat) in the direction of the open position before such flushing, as is depicted by way of example in FIG. 3A or 3B. As can be seen from FIGS. 3A and 3B, the lid 5 is less open in this position than in the open position of the lid 5 depicted by way of example in FIG. 4. During flushing, the lid is preferably in the position depicted by way of example in FIG. 3A or 3B. In this position, in which the closing element 5a is open and the transport device 60 has preferably lifted the lid 5 appropriately (somewhat) by means of the rail 50, the fluid for flushing the fluid conduit 53 can consequently easily exit from the pressure vessel 2, without materials or chemicals present in the reaction chamber 3 escaping or spraying out from the pressure vessel 2 or reaction chamber 3. In more precise terms, as can readily be seen in FIG. 3A or 3B, a (small) gap is present between the lid part 5c, preferably the periphery thereof, and the inner vessel 3a, so that the flushing fluid, including the materials flushed out by the flushing fluid, can exit through this gap.

The control device is preferably configured, before flushing in the somewhat opened position of the lid 5, to reduce the pressure prevailing in the reaction chamber 3 via a valve connected to the third connection 55, for example via the valve 56a. The control device is preferably additionally configured to close this valve again before the lid 5 is moved in the direction of the open position (for flushing). The valve or the pressure reduction brought about by the valve in particular have the effect here that the fluid can flow in the direction of the reaction chamber 3 for flushing the fluid conduit 53. In addition, as a result of the abovementioned decrease in pressure, chemicals located in the reaction chamber 3 are prevented from being able to escape, especially squirt out, from the reaction chamber 3 when the lid 5 is open.

The control device is preferably configured for the abovementioned flushing to be carried out immediately after or before a pressure reaction carried out in the reaction chamber 3, so that a sufficiently cleaned fluid conduit 53 and/or reaction chamber 3 is present for each pressure reaction. The control device can also be configured for (automatically) carrying out the cleaning or flushing operation after the samples P have been taken out and while the lid 5 is in the closed position or has been moved down.

FIG. 5 shows, by way of example, a second embodiment of the pressure vessel system 1 according to the invention. Everything that has been said in respect of the above-described first embodiment applies analogously to the second embodiment, unless indicated otherwise in the further text.

The pressure vessel system 1 according to the second embodiment differs from the pressure vessel system 1 of the first embodiment particularly in respect of the connection between pressure vessel 2 and rigid rail 50. In this embodiment, the rail 50 is specifically not rigidly connected to the lid 5 but instead to the pressure vessel wall 4. The rigid (mechanical) connection between pressure vessel wall 4 and rail 50 is preferably in an upper region of the pressure vessel wall 4, in particular directly below the lid 5 or securing element 5a. The rail 50 is particularly preferably connected to the pressure vessel wall 4 in a region between cooling conduit 4a and flange region 4d, preferably connected to the pressure vessel wall 4 in a region between cooling conduit 4a and flange region 4d.

The fluidic connection between reaction chamber 3 and fluid conduit 53 is preferably effected at least via the pressure vessel wall 4 and the lid 5, in particular via the second connection 52 and a drilled hole 4e formed in the pressure vessel wall 4 and preferably via a further drilled hole 5d formed in the lid 5. In the closed position of the lid 5, the drilled holes 4e and 5d are accordingly fluidically connected to one another in order to fluidically connect the fluid conduit 53 to the reaction chamber 3. In the closed position of the lid 5, the transition from the drilled hole 4*e* to the drilled hole 5*d* can be sealed by at least one appropriate sealing element (sealing ring, etc.) or an appropriate sealing coupling, so that no fluid can escape at this transition. In the closed position, the clamp 5*a* preferably presses the at least one sealing element or the parts of the sealing coupling (together) in such a way that the sealing effect is obtained at the transition from the drilled hole 4*e* to the drilled hole 5*d*. The accommodation device 8*c* or the drilled hole thereof preferably provides the fluidic connection between reaction chamber 3 and drilled hole 5*d*.

However, the present invention is not restricted to the preferred embodiments which have been described by way of example, as long as it is encompassed by the subject matter of the claims below. All features can be advantageously combined with one another in any way. In particular, the transport device 60 can also be employed for moving the lid 5 of the second embodiment, for example by the transport device 60 being mechanically connected to the lid 5 via an appropriate raising and lowering element.

The invention claimed is:

1. A pressure vessel system (1) comprising:
a pressure vessel (2) having a reaction chamber (3) as a pressure space for initiating and/or promoting chemical and/or physical pressure reactions of samples (P) accommodated in the reaction chamber (3), and
a rigid rail (50) which is rigidly connected to a part of the pressure vessel (2) and has a first connection (51) to a fluid inlet, a second connection (52) to a fluid outlet and a fluid conduit (53) which fluidically connects the first connection (51) to the second connection (52),
wherein the fluid conduit (53) is fluidically connected to the reaction chamber (3) via the second connection (52),
wherein the rail (50) has at least one third connection (55) which is fluidically connected to the fluid conduit (53) and can be connected to a device (56), so that the device (56) is fluidically connected to the fluid conduit (53) and thus to the reaction chamber (3),
wherein the fluid conduit is provided integrally with the rigid rail,
wherein the pressure vessel (2) has a lid (5) which can be moved between an open position, in which the reaction chamber (3) is open, and a closed position, in which the reaction chamber (3) is closed, and wherein the rail (50) is rigidly connected to the lid (5),
wherein the rail (50) is configured and connected to the lid (5) in such a way that the lid (5) can be moved between the open position and the closed position by moving the rail (50), and
wherein the rail (50) is configured and connected to the lid (5) in such a way that the lid (5) can be moved between the open position and the closed position by vertically moving the rail (50).

2. The pressure vessel system (1) as claimed in claim 1, further comprising a transport device (60) for moving or raising and lowering the rail (50) and thus for moving the lid (5) between the open position and the closed position.

3. The pressure vessel system (1) as claimed in claim 2, wherein the rail (50) has a fastening region (57) via which the rail (50) is fastened to the transport device (60).

4. The pressure vessel system (1) as claimed in claim 2, wherein the rail (50) can be moved relative to the transport device (60) or an axis and wherein the pressure vessel system (1) has a sensor which is able to recognize the closed position of the lid (5) on the basis of a relative movement of the rail (50) relative to the transport device (60) and relative to the axis, wherein the relative movement is brought about by moving the lid (5) into the closed position.

5. The pressure vessel system (1) as claimed in claim 4, wherein the sensor is able to measure a contact pressure force of the lid (5) due to the relative movement for closing the reaction chamber (3) in the closed position and recognize the closed position as soon as the contact pressure force exceeds a defined threshold contact pressure force.

6. The pressure vessel system (1) as claimed in claim 2, further comprising a control device for controlling the device (56) fluidically connected to the rail (50) and/or for controlling the movement of the rail (50).

7. The pressure vessel system (1) as claimed in claim 6, wherein the control device is configured for introducing a fluid via the first connection (51) into the fluid conduit (53) in order to flush the fluid conduit (53).

8. The pressure vessel system (1) as claimed in claim 7, further comprising a valve (56*a*) connected to the at least one third connection (55), wherein the control device is configured for opening the valve (56*a*) before flushing, so that a pressure prevailing in the reaction chamber (3) is reduced.

9. The pressure vessel system (1) as claimed in claim 1, wherein the at least one third connection (55) is integral with the rail.

10. The pressure vessel system (1) as claimed in claim 1, wherein the at least one third connection (55) has a fastening structure.

11. The pressure vessel system (1) as claimed in claim 1, wherein the at least one third connection (55) is configured for connecting the device (56) to the rail (50) in an assembly direction, wherein the assembly direction is essentially perpendicular to a flow direction of the fluid conduit (53).

12. The pressure vessel system (1) as claimed in claim 1 comprising at least two third connections (55).

13. The pressure vessel system (1) as claimed in claim 1, wherein the first connection (51) can be fluidically connected to a compressor (70).

14. The pressure vessel system (1) as claimed in claim 13, further comprising a nonreturn valve (75) which is provided upstream of the first connection (51) and is able to block flow from the first connection (51) in the direction of the compressor (70).

15. The pressure vessel system (1) as claimed in claim 14, further comprising a buffer (76) which is provided upstream of the first connection (51) and has a defined intrinsic volume for buffering fluid flowing out of the compressor (70) in the direction of the first connection (51).

16. The pressure vessel system (1) as claimed in claim 15, wherein the buffer (76) has a filter for filtering fluid flowing out from the compressor (70) in the direction of the first connection (51).

17. The pressure vessel system (1) as claimed in claim 15, further comprising a further nonreturn valve (77) provided upstream of the buffer (76), wherein the further nonreturn valve (77) is able to block flow from the buffer (76) in the direction of the compressor (70).

18. The pressure vessel system (1) as claimed in claim 1, wherein the rail (50) is made of a high-pressure-resistant material and/or
wherein the rail (50) is made of a chemically resistant material and/or wherein the fluid conduit (53) has a chemically resistant lining.

19. The pressure vessel system (1) as claimed in claim 1, wherein the rail (50) is made of metal and/or of a block.

20. The pressure vessel system (1) as claimed in claim 1, wherein a wall thickness of the rail (50) is greater than a cross section of the fluid conduit (53).

21. The pressure vessel system (1) as claimed in claim 1, wherein the rail (50) is elongated.

22. The pressure vessel system (1) as claimed in claim 1, wherein the rail (50) has a round or angular cross section.

23. The pressure vessel system (1) as claimed in claim 1, wherein the fluid conduit (53) has only one direction of extension.

24. The pressure vessel system (1) as claimed in claim 1, further comprising at least one device (56) connected to the at least one third connection, wherein the at least one device (56) comprises:

a valve, a pressure measuring device (56*c*, 56*d*) for measuring pressure prevailing in the reaction chamber (3) and/or a pressure safety device (56*e*).

25. A pressure vessel system (1) comprising:

a pressure vessel (2) having a reaction chamber (3) as a pressure space for initiating and/or promoting chemical and/or physical pressure reactions of samples (P) accommodated in the reaction chamber (3), wherein the pressure vessel (2) has a pressure vessel wall (4) surrounding the reaction chamber (3), and a rigid rail (50), wherein the rail (50) is rigidly connected to the pressure vessel wall (4) and has a first connection (51) to a fluid inlet, a second connection (52) to a fluid outlet and a fluid conduit (53) which fluidically connects the first connection (51) to the second connection (52), wherein the fluid conduit (53) is fluidically connected to the reaction chamber (3) via the second connection (52), wherein the rail (50) has at least one third connection (55) which is fluidically connected to the fluid conduit (53) and can be connected to a device (56), so that the device (56) is fluidically connected to the fluid conduit (53) and thus to the reaction chamber (3), wherein the pressure vessel (2) has a lid (5) which can be moved between an open position, in which the reaction chamber (3) is open, and a closed position, in which the reaction chamber (3) is closed.

26. The pressure vessel system (1) as claimed in claim 25, wherein the pressure vessel wall (4) has a drilled hole (4*e*) and wherein the fluid conduit (53) is fluidically connected, at least via the second connection (52) and the drilled hole (4*e*), to the reaction chamber (3).

27. The pressure vessel system (1) as claimed in claim 25, further comprising a fastening device (54) for fastening the rail (50) to the part of the pressure vessel (2).

* * * * *